INVENTORS.
GEORGE M. HIPPLE
JACK S. HICKMAN
BY

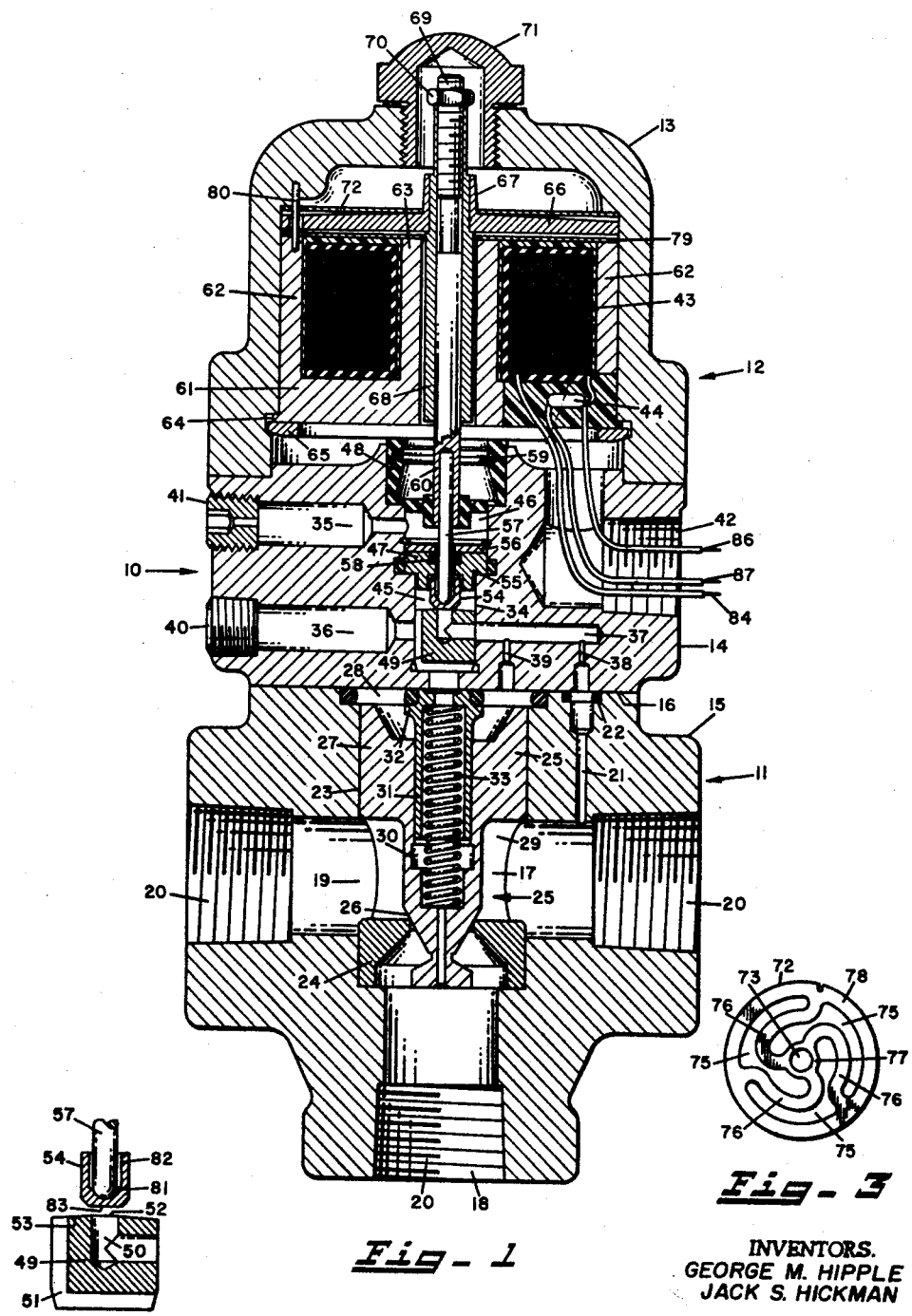

WOOD, HERRON & EVANS

United States Patent Office 3,181,559
Patented May 4, 1965

3,181,559
ELECTROMAGNETIC AND FLUID PRESSURE OPERATED VALVE AND ANTI-HYSTERESIS CONTROL CIRCUIT THEREFOR
George M. Hipple and Jack S. Hickman, Columbus, Ohio, assignors to American Brake Shoe Company, New York, N.Y., a corporation of Delaware
Filed Oct. 19, 1960, Ser. No. 63,569
25 Claims. (Cl. 137—489)

This invention relates to hydraulic system control valves of the type which are both electromagnetically and fluid pressure operated. More specifically, it relates to an electric circuit for controlling the actuation of such valves.

Electromagnetically and fluid pressure operated valves of the type in conjunction with which the control circuit of the present invention is adapted for use are characterized by the ability to control fluid functions in a hydraulic system or line in relation to the amount of electric current supplied to them. Such a valve is shown in co-pending United States patent application Serial No. 855,629, filed November 27, 1959, and entitled "Electric and Fluid Pressure Operated Valve Mechanism," now abandoned. Valves of this general type may be employed for various purposes as, for example, to maintain predetermined pressure in a hydraulic system or portion thereof, or as sequence or pressure reducing valves, as well as for other purposes.

In the valve of the above mentioned application, direct current is applied to the coil of an iron-core electromagnetic transducer in a control or servo portion of the valve, causing a magnetic field to be established which actuates a magnetic movable valve element. This movable valve element is urged by the electromagnetic field toward a port which communicates with a control chamber, in opposition to a fluid pressure thereat. This pressure, in turn, controls a poppet type main pressure valve. The electromagnetic transducer indirectly and with hydraulic assistance maintains the main poppet valve in closed position until the fluid pressure in the control chamber overcomes the mechanical force of the transducer and permits the main poppet to open, thereby controlling the pressure in the main circuit by reducing or releasing it; thereafter the force of the transducer indirectly and with hydraulic assistance controls the main poppet to maintain the pressure in the control chamber at a substantially constant level. While the control circuit of this invention is primarily intended for use with a valve of the type shown in the aforesaid patent application, it is inherently suited for use in conjunction with other electrically and fluid pressure operated valves which include electromagnets for controlling the operation of a movable valve element.

Briefly, it is the object of the present invention to provide a control circuit for an electromagnetically and fluid pressure operated valve whereby the valve response pressure may be electrically preset with a high degree of accuracy at any desired value within the operating range of the valve. In the past, the effect of hysteresis in the ferromagnetic core of the elecomagnetic transducers of such valves has made it difficult if not altogether impossible to preset such valves for response at given pressure with any degree of accuracy. It has been necessary, for example, to control the valves by reference to a pressure gauge, a factor which has restricted remote valve control, as from a control panel. In contrast with such operation, the present invention contemplates the combination of an electrohydraulic valve with a control circuit which is effective to minimize the effects to hysteresis in the electromagnetic transducer, whereby the mechanical force delivered by the movable element of the transducer, and consequently the valve response pressure, is rendered substantially independent of the past magnetization of the core of the transducer, and whereby valve response pressure is determined solely by the magnitude of the current supplied to the valve. In other words, the present invention provides an anti-hysteresis control for the valve such that the valve may be controlled without reference to a pressure gauge, and such that the valve may be electrically preset for operation at any desired pressure from a position remote from the valve.

When an electromagnet which comprises a soft magnetic core wound with a current-carrying coil is energized, the magnetic flux induced in the core is determined both by the magnitude of the current in the coil and by the past magnetization of the core; for instance, the flux induced by a given current in a core which had been previously magnetized and which retained some of its magnetism will differ from that induced by the same current in a core which is initially unmagnetized. Because of the differing fluxes induced in it, the core will exert different attractive forces on a movable magnetic armature within its field in each instance. This is a well known effect of the hysteresis of magnetic materials, that property which causes the magnetization of the material to lag behind the force that produces it. While the hysteresis of soft magnetic materials is relatively low, in no known ferromagnetic material is it negligible, and it inevitably influences the response of an electromagnet to an applied current.

In consequence of the hysteresis characteristic of magnetic materials, it is difficult to establish a flux of given magnitude in magnetic material without knowledge of the magnetization, if any, which it retains from previous magnetizations. The application of constant direct current of given magnitude to the coil of an electromagnetic transducer will not always induce the same magnetization or flux in the core of the transducer, and therefore will not cause the transducer always to supply the same mechanical force. It follows from this that one cannot accurately preset an electromagnetically and fluid pressure operated valve for actuation at a predetermined pressure merely by applying given direct current to the transducer of the valve. For example, if such a valve is employed as a pressure control valve, the pressure maintained at a given valve coil current is not determined by the magnitude of the current alone, but also depends in substantial part upon the past magnetization of the core of the transducer, by reason of the hysteresis of the ferromagnetic material in the core.

For simplicity of control it is desirable that the response of an electromagnetically and fluid pressure operated valve should be consistently and predictably determinable by the current applied to the valve, without regard to its past history of magnetization. The present invention accomplishes this by providing a valve control circuit which effectively eliminates hysteresis as a variable factor in determining valve response, so that response is determined by valve current alone, by applying to the valve coil a specialized type of current.

A further objective of the invention has been to provide an electromagnetically and fluid pressure operated valve and control circuit whereby the valve may be accurately and consistently set at any of a number of preselected valve settings in response to an electric signal. Simply by closing a switch, for example, the valve repeatedly may be set to maintain a predetermined pressure, regardless of the past magnetization of the valve coil.

A preferred embodiment of the concept upon which this invention is predicated comprises an electrohydraulic valve having an electrical transducer for controlling valve setting which includes an electromagnet providing mechanical valve control movement related to the electrical energy supplied to the transducer, and an electrical control circuit comprising a transformer the primary winding of which is connectable through voltage limiting means to a source of alternating voltage and the secondary winding of which is connectable through the coil of the valve and current limiting means to a source of direct current. When energized, this circuit supplies to the valve coil a modulated direct current which fluctuates about an average value in accordance with the amplitude of the alternating voltage superimpressed on it. We have found that this modulated or fluctuating direct current induces a magetic flux in the core of the valve transducer which fluctuates about an average value determined by the direct voltage and which accurately corresponds to a definite valve setting.

We have discovered that when the strength or amplitude of the modulating voltage remains constant throughout the range of adjustment of the operating direct voltage, the hysteretic effect within the ferromagnetic material of the transducer is not eliminated throughout the entire range of adjustment of the operating voltage, and we have proven that when the strength or amplitude of the modulating voltage and the direct operating voltage are varied inversely and in the proper proportions, the hysteretic effect in the ferromagnetic material of the transducer is essentially eliminated over the entire range of adjustment of the operating direct voltage.

When the ideal inverse ratio between the strength or amplitude of the modulating voltage and the operating direct voltage is attained the electromagnetic transducer is rendered substantially insensitive to its past magnetization since the effects of hysteresis are averaged or normalized and a definite, fixed valve setting may be specified for any given coil current, so that valve response may be accurately preset merely by controlling coil current.

The invention may best be further described in relation to the drawings, in which:

FIGURE 1 is a view in section of an electromagnetically and fluid pressure operated valve of the general type with which the control circuit of this invention is adapted to be used, including a pressure differential operated main valve adapted to function in a hydraulic system and a control valve device for determining or controlling the operation of the main valve;

FIGURE 2 is a view in section on an enlarged scale of elements of a valve which is employed in the control section or part of the apparatus seen in FIGURE 1;

FIGURE 3 is a view on a reduced scale of a thin wheel-like diaphragm type guide element employed in the transducer of the electromagnetically and hydraulically controlled valve device seen in FIGURE 1;

Figure 4:
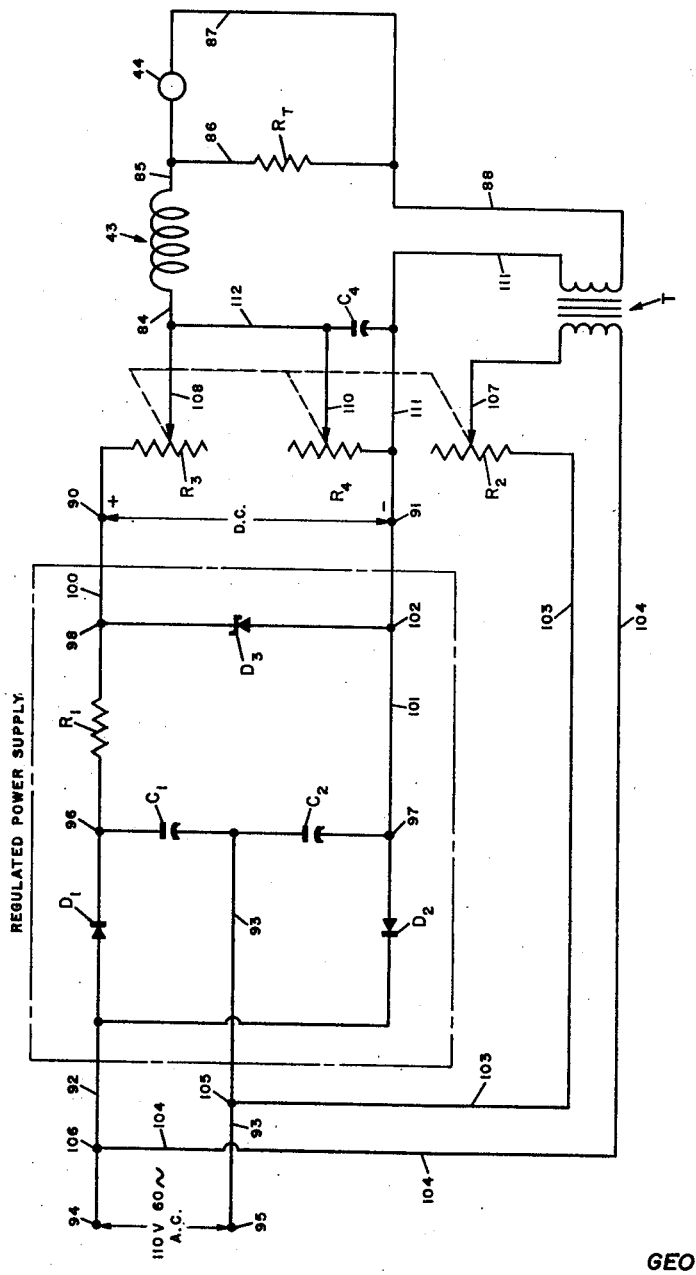
FIGURE 4 is a schematic diagram of a preferred circuit embodying the principles of the invention, in conjunction with a regulated direct current power supply and an electromagnetically and fluid pressure operated valve.

The particular electromagnetically and fluid pressure operated valve 10 shown in FIGURES 1 through 3 of the drawings is an example of the type of valve with which the circuit of the invention is utilized. This valve 10 includes a main valve assembly 11 adapted to operate in a hydraulic system and a control valve assembly 12 for controlling the operation of the main valve assembly 11. As shown in the drawings, the main valve assembly 11 and the control valve assembly 12 are contained within a common body, casing or housing comprised of three body elements 13, 14 and 15. The body element 14 is attached to the body element 15 and the body element 13 is attached to the body element 14 by screws, none of which are shown in the drawings.

The body element 15 is a casting which is generally of cross-shaped configuration when viewed from either side, and is provided with a flat generally circular top 16 from which a stepped central vertical bore 17 extends through the body to a fluid outlet port 18. A transverse bore 19 in the body 15 intersects the vertical stepped bore 17 and forms a fluid pressure inlet or through passageway in the body 15. The port 18 as well as the ends of the bore 19 are threaded, as at 20, for permitting the valve body element 15 to be connected into a hydraulic system. The body 15 is also provided with a vertical bore or passageway 21 which extends from the high pressure bore or passageway 19 to the flat top 16 of the body element 15 where it is enlarged to receive an O-ring 22.

The bore 17 forms a cylinder 23 into the bottom of which a valve seat 24 is pressed against a shoulder. This cylinder 23 receives a combination piston and poppet type valve 25 including a valve element 26 adapted to engage and close the seat 24 and a piston portion 27. The piston portion 27 divides the cylinder 23 into an upper control pressure chamber 28 and a lower pressure chamber 29, the latter of which is in constant communication with the high pressure passageway or bore 19. The piston valve element is provided with a stepped central or axial through-bore 30 the larger diameter upper portion of which slidably receives a piston 31 which may balance the area on the top of the piston 25, which area is exposed to pressure in the control chamber 28, with that area on the bottom of the piston 25, which area is exposed to the pressure in the pressure chamber 29. In the particular valve shown, the piston 31 is slightly smaller in diameter than the opening in the valve seat 24. The upper end of the area balancing piston 31 has a small flange 32 projecting radially outwardly therefrom which receives an O-ring, and is formed to include a central internal socket which receives a compression type coil spring 33. This spring 33 abuts the wall at the upper end of the area balancing piston 31 and a shoulder in the valve element 25, and urges the valve element downwardly to close the opening in the valve seat 24. The area balancing piston 31 is also provided with a central opening in its upper end wall whereby fluid may flow through it and through bore 30 in piston 25 to reach the outlet port 18.

The body element 14 includes a flat generally circular bottom surface adapted to mate with the top surface 16 of the body element 15 and to sealingly engage the O-ring 22 as well as the O-rings which are carried by the upper end of the area balancing piston 31 and the cylinder 23. The body element 14 is also provided with a stepped central bore 34 the axis of which is aligned with the axis of the bore 23 in body member 15, and which is joined at spaced points by horizontally extending bores 35, 36, and 37. The bore 37 is connected with the bore 21 in body 15 and with the control pressure chamber 28 by a pair of restrictors in the form of orifices 38 and 39 respectively. Bore 36 is closed by a solid plug 40, while bore 35 is partially closed by a breather or vent plug 41. The body element 14 is also provided with an internally threaded passageway 42 through which pass insulated electric wires 84, 86 and 87 connected to the electric coil 43 and thermistor 44 of an electro-mechanical transducer assembly which is contained within the body member 13.

The bore 34 is divided into two chambers, one a wet chamber 45 and the other a dry chamber 46, by a seal and guide assembly 47 and a diaphragm in the form of a flexible boot 48 which may be made of neoprene or any other suitable flexible material. A cylindrical valve seat insert 49 (see FIGS. 1 and 2) is pressed into that portion of the stepped bore 34 which cooperates in forming the wet chamber 45 and against a shoulder at one end thereof. This valve seat 49 is provided with a right angled passageway 50 formed by two intersecting bores which connect the bore 37 in the body 14 to the center of the upper end or valve seat of the insert 49. The valve seat insert 49 also includes a fluid conducting groove 51 which extends axially along its side and across its bottom to connect the wet chamber 45 with the bore 36 and with a small diameter opening at the bottom end of the stepped bore 34, which opening is aligned and communicates with the opening in the top of the area balancing piston 31.

The upper end of the valve seat insert 49 is provided with a circular flat surface 52 which surrounds the exit of the passageway 50. From this flat surface 52 it is tapered downwardly and outwardly, as at 53, in a conical shape to its outside cylindrical walls. The flat portion 52 is provided to form a valve seat against which the flat bottom surface of a cup-shaped valve element or poppet 54 is urged. The cone-shaped surface 53 surrounding this flat portion is provided to reduce or eliminate friction upon fluid flowing across it from between the valve element 54 and the flat circular seat 52.

The valve element 54 is contained within the wet chamber 45 and its upper end fits loosely within an inverted cup formed in part by a cylindrical wall extending from the lower or bottom side of the seal and guide assembly 47. The clearance between the valve element 54 and the cup on the guide and seal assembly 47 is such as to permit the valve element 54 to move from the valve seat 52, and the side walls of the inverted cup on the seal and guide assembly 47 normally do not contact the side walls of the valve element 54.

The seal and guide assembly 47 includes a circular disk 55 having cylindrical outer walls. This disk is inserted into that portion of the bore 34 which cooperates in forming the dry chamber 46 and against a shoulder therein which is adjacent the upper end of the wet chamber 45. An O-ring seal which is contained within an annular groove in the bore 34 adjacent the shoulder engages the cylindrical outer wall of the disk 55 and seals it to the bore. The disk 55 is retained against axial movement in the bore 34 by a washer 56 and a snap ring, the latter being seated in an annular groove in the wall of the bore 34. The disk 55 is also provided with a central axial bore through which extends an operating rod 57 for the valve formed by the element 54 and seat 52. This central bore is provided with a groove adjacent its top in which an O-ring 58 is inserted. This O-ring is held in the groove by the bottom surface of the washer 56.

Rod 57 does not contact either the disk 55 or the washer 56 and is supported by the O-ring 58. By this means the rod 57 is sealed with the guide assembly 47 in a substantially frictionless manner, because the axial motion of the rod 57 is generally in the nature of not more than two thousandths of an inch under which conditions the O-ring 58 forms an anti-friction bearing since it tends to roll upon the rod 57 as the latter is reciprocated.

From the foregoing, it will be seen that the seal and guide assembly 47 divides the bore 34 into the two chambers 45 and 46. The upper end of the dry chamber 46 is closed by the previously mentioned flexible boot 48 which is inserted into the bore 34 and against a shoulder therein. An expansible type coil spring 59 retains the boot 48 in the bore 34, and the boot is provided with a thickened elastic central portion having a bore which surrounds and sealingly elastically grips a non-magnetic brass shaft 60 which carries the rod 57.

The body element 13 is cast of a non-magnetic material such as aluminum, and it is bored to receive a core 61 in which the coil 43 and thermistor 44 of the transducer assembly are housed. The core 61 and an armature disk 66 which is positioned above it are preferably formed of material which has high magnetic permeability and low hysteresis such as an ingot iron. The core 61 is a cup shaped cylinder having side walls 62 which provide magnetic poles and a hollow center post 63 which also provides magnetic poles. The coil 43 is embedded in an insulating plastic material in the core 61 and the thermistor 44 is embedded in the same plastic material in a notch-like opening formed in the bottom of the core 61. The outside diameter of the core 61 is such as to have a close slidable fit with the bore in the body element 13 and it is provided with a peripheral flange 64 which abuts a shoulder on the body element 13. The shoulder 64, and consequently the core 61, is clamped to the body element 13 by a snap ring 65 provided with one tapered side which seats against one side of a groove in the body element 13.

The electromagnet above described including the core 61 and coil 43 operates an armature which includes the disk 66 which has a hollow hub 67 into which a tube 68 of non-magnetic material is pressed. The armature disk 66 extends over the outside magnetic poles formed by the side walls 62 and the tube 68 extends freely through the center post or poles 63 of the core 61. The armature disk 66 does not contact the body element 13. The shaft 60 fits snugly but slidably axially within the tube 68 of the armature and its upper end is abutted by an adjusting screw 69 which is threaded into the upper end of the tube 68 and which is provided with a locking nut 70. An externally threaded hollow plug 71 which covers the screw 69 and nut 70 is threaded into the body member 13.

The upper end of the armature assembly including the disk 66, tube 68 and rods 60 and 57 is supported against lateral movement by a thin diaphragm 72 of non-magnetic material. This diaphragm 72 (see FIGURE 3) is provided with a central opening 73 which fits snugly around the tapered hub 67 of the disk 66 and its outer edge abuts the walls of the bore in the housing member 13. In order that the diaphragm 72 may support the armature for substantially unrestrained axial movement with substantially no lateral movement, the diaphragm 72 is cut out as at 75 to provide curved flexible connecting portions or spokes 76 between its hub 77 and rim 78 which rim engages the body element 13 at its peripheral edge and its top.

A thin spacer washer 79 which is also formed of non-magnetic material is positioned between the armature disk 66 and the magnetic poles formed by walls 62 and center post 63 of the core 61. This spacer washer 79 does not contact the tube portion 68 of the armature, but its peripheral edge preferably abuts the body element 13 in order to prevent movement of the spacer washer with respect to it and the core 61.

Rotation of the diaphragm 72, the spacer washer 79 and the core 61 with respect to each other and the body element 13 is prevented by a non-magnetic pin 80 which extends through the members 72, 66 and 79 and into aligned openings, one in the body element 13 and one in the core 61. The opening in the armature disk 66 through which pin 80 extends is of a larger diameter than that of the pin 80 in order that should the disk 66 contact the pin 80 during operation of the device, there will be substantially no frictional resistance between them. The pin 80 is extended through the disk 66 for the purpose of holding it against rotation during adjustment of the screw 69 and nut 70.

The valve mechanism 10 described above is an electromagnetically and fluid pressure controlled valve adapted to have its transverse bore 19 connected with or into a conduit in which it is to control fluid pressure. When the valve mechanism 10 is so connected, its outlet port 18 will usually be connected to a tank or reservoir which is under atmospheric pressure.

It will be apparent from the following description that the main valve assembly 11 is operated by a pressure differential and the spring 33 and that when the valve mechanism 10 is connected as above described and its transducer is closing the valve 52, 54, fluid pressure in the transverse bore 19 and chamber 29 is applied to the underside of the piston portion 27 of the valve element 25.

This same pressure is also applied to the chamber 28 and the top of the piston portion 27 through the restricted passageway including the passageway 21, the orifice 38, bore 37 and orifice 39. Since the areas on the top and bottom of the piston portion 27 which are exposed to the fluid pressure are substantially equal, the valve element 25 will be urged downwardly by the spring 33 so that its valve portion 26 closes the seat 24 and isolates the outlet port 18 from the bore 19.

The pressure limiting and shut-off valve 52, 54 in the chamber 45 and the orifice 38 function to control the pressure differential, i.e., the difference in pressure in the chambers 28 and 29. When fluid is permitted to flow through the valve 52, 54 the fluid enters the wet chamber 45 and flows to the outlet port 18 through the groove 51, the aligned openings in the bottom of the bore 34 and the top of the area balancing piston 31, through the piston 31 and the center of the valve element 25 to port 18.

When fluid pressure in the transverse bore 19, chambers 28 and 29 and passageways 21 and 37, acting upon the valve element 54, overcomes the magnetic force of the transducer, fluid will begin to flow through the pressure limiting and shut-off valve 52, 54, so that a pressure drop across the orifice 38 is created. The pressure at the high pressure side of the orifice 38 is applied to the bottom of the piston portion 27 of the valve element 25, while the reduced or lower pressure at the low pressure side of the orifice 38 is applied to the top side of the piston portion 27. When this pressure differential, i.e., the pressure drop across the orifice 38, exceeds the force of spring 33, valve element 25 will be moved upwardly and will open the main valve 24, 26 an amount which is proportional to the pressure drop. The orifice 39 between the bore 37 and the chamber 28 is provided to prevent fluttering of the valve element in the bore 17 when the valve 52, 54 is opened and/or closed quickly. This orifice preferably has a bore or internal diameter which is slightly larger than the bore in the orifice 38.

With reference to FIGURES 1 and 2 of the drawings, the cup-shaped valve element 54 is provided with a semi-spherical socket 81 in which the semi-spherical end of the rod 57 seats. The interior side walls 82 of the cup-shaped element are spaced from the rod 57 a distance sufficient to permit the element 54 to pivot or swivel upon the rod 57. This pivotal or swivel type motion permitting connection or joint between the rod 57 and the element 54 is provided to insure that the flat bottom 83 of the element 54 can and will seat properly upon the valve seat 52 even though there may be small manufacturing errors in the alignment of the various parts of the valve. The cup formed on the bottom of the disk 55 retains the valve element or poppet 54 in such position that rod 57 will enter the semi-spherical socket 81 when the rod 27 is inserted through the O-ring 58 and disk 55.

The above described valve structure is the subject of co-pending United States application Serial No. 855,629. It is to be understood that while that valve comprises a preferred valve with which the circuit to be described is adapted to be used, the circuit is not limited to use with that specific valve alone but may be utilized with other electromagnetically and fluid operated valves.

As will be explained, the armature assembly of the transducer is electromagnetically urged in a direction to close the valve 52, 54, and is urged in the opposite direction by the fluid pressure acting upon the bottom surface 83 of the valve element 54. When this fluid pressure overcomes a predetermined electromagnetic force of the transducer, the valve will be opened to a position whereat the fluid forces acting upon the surface 83 exactly counterbalance the counteracting electromagnetic forces. Should the fluid forces acting upon the surface 83 of the valve element 54 vary in even the slightest degree, then the opening through the valve 52, 54, will be varied to adjust the pressure drop across the orifice 38, thereby causing the position of the valve element 25, and consequently the degree of opening of the valve 24, 26, to be adjusted to maintain the desired pressure in the passageway 19. It has been found during repeated tests and in the actual operation of the control valve assembly 10 that neither of its valves 24, 26, nor 52, 54, tends to "hunt" when the electric current supplied to its coil, or pressure conditions in its passageway 19, are changed and that the device responds quickly even to sudden changes in electric current and/or pressure.

The force exerted by an electromagnet on an armature spaced from it is inversely proportional to the square of the distance between the armature and the poles of the magnet when the magnetomotive force is held constant. For this reason the coil and core of the transducer are preferably made large in order that there may be a wide air gap between the armature disk 66 and the poles 62 and 63 whereby in the range (0–.002 inch) in which the armature moves, the force acting upon the armature will remain substantially constant for any given magnetomotive force produced by the coil 43 and the transducer will deliver a substantially constant force within its predetermined stroke range in response to that magnetomotive force.

FIGURE 4 of the drawings shows an electrical circuit embodying the principles of the invention in connection with a D.C. power supply and the coil 43 of an electromagnetically and fluid pressure operated valve, whereby the valve may be accurately preset at any desired response pressure within its operating range. In the drawing, the power supply is shown within dashed lines and is designated "Regulated Power Supply." It is to be understood that while the power supply here shown and subsequently described forms the preferred means for supplying a regulated or constant direct current to the control circuit, the control circuit may be used with any other suitable source of constant D.C. voltage.

The coil 43 will tend to heat up under typical conditions of operation, which normally is accompanied by an increase in its resistance. Since this increase in coil resistance would diminish the coil current and thereby cause the electromagnetic flux of the coil to decrease, thermistor 44 is preferably included in series with coil 43 by connection with coil lead 85, between leads 86 and 87. A resistor $R_T$ is connected in parallel with thermistor 44 between leads 86 and 87. The combination of coil 43, thermistor 44, and resistor $R_T$ presents a combined resistance which varies only a minimal amount with temperature, so that the overall resistance through which the circuit current passes is substantially constant. This combination of resistance elements will thus be understood to be equivalent to a temperature constant resistance.

The preferred power supply shown in FIGURE 4 is designed to operate on conventional 110 volt, 60 cycle alternating current, and is relatively simple and compact, for which reasons it comprises a preferred although not a necessary adjunct to the control circuit to be described. The power supply shown supplies a regulated or constant 108 volt direct current output to the control circuit at connections 90 and 91. Power supply leads 92 and 93 are connectable to a conventional source of alternating current, not shown, at 94 and 95 respectively.

A diode $D_1$, permitting current flow to the right, is connected between lead 92 and a junction 96, while reversely oriented diode $D_2$, permitting current flow to the left but not the right, is connected from a junction 97 to lead 92. Condenser $C_1$ is connected from junction 96 to lead 93, and condenser $C_2$ is connected in series with condenser $C_1$, from lead 93 to junction 97. Resistor $R_1$ is connected from junction 96 to a junction 98. Output lead 100 is connected to junction 98 and is connected or connectable to the control circuit at 90. Output lead 101 is connected to junction 97 and is connected or connectable to the control circuit at 91. A Zener diode $D_3$ is connected across leads 100 and 101, between junctions 98 and 102.

In operation of the power supply, condensers $C_1$ and $C_2$ are charged through diodes $D_1$ and $D_2$ on opposite half-cycles of the input current, so that a relatively high, fluctuating potential exists between points 96 and 97. The Zener diode regulates the potential between points 98 and 102 so that a lower, substantially constant potential is supplied at connections 90 and 91, connection 90 being positive with respect to connection 91.

Preferred parameters of the power supply circuit, given only by way of example, are as follows: $D_1$ and $D_2$, 150 ma.; $C_1$ and $C_2$, 10 mfd.; $R_1$, 4500 ohms; $D_3$, 108 volts (Zener). The output of the circuit incorporating such components is about 108 volts D.C.

Referring now to the preferred control circuit of FIGURE 4, leads 103 and 104 are connectable to a conventional source of alternating current, as by respective connection to lead 93, at point 105, and to lead 92, at point 106. Lead 103 is connected to a variable resistor $R_2$ which has an adjustable tap 107. Tap 107 is connected to one end of the primary winding of a transformer T, the other end of the primary being connected to lead 104.

A variable resistor $R_3$ having an adjustable tap 108 is connected or connectable at one end to the power supply at 90, tap 108 being connected to the valve coil 43 through lead 84. A variable resistor $R_4$ having a tap 110 is connected or connectable to the power supply at 91 through lead 111. Tap 110 of resistor $R_4$ is connected to coil lead 84 by lead 112, and a condenser $C_4$ is connected between tap 110 of resistor $R_4$ and lead 111. The secondary winding of the transformer is connected at one end to lead 111 and at the other end to lead 88, which is connected to $R_T$ and lead 87. The respective taps 107, 108 and 110 of resistors $R_2$, and $R_3$, and $R_4$ are ganged as shown for simultaneous movement.

Preferred parameters for the various electrical components of the control circuit are approximately as follows: $R_2$, 1000 ohms; $R_3$, 5K ohms; $R_4$, 25K ohms; $C_4$, 1 mfd.; $R_T$, 5600 ohms; and coil 43, 6000 ohms.

The operation of the control circuit may now be explained. When energized, direct current from the power supply flows from positive connection 90 through resistor $R_3$ to tap 108, through the valve coil 43 and parallel-connected thermistor 44 and resistor $R_T$ to lead 88, then through the secondary winding of transformer T and lead 111 to negative connection 91 of the power supply. The magnitude of this current may be varied by adjusting variable resistors $R_3$ and $R_4$.

Application of an alternating potential to leads 103 and 104 of transformer T induces an alternating potential in the secondary winding of the transformer. This establishes an alternating voltage which is applied to or superimposed on the direct voltage applied to the coil 43. This alternating voltage is induced in the secondary winding of transformer T and is applied to the circuit through lead 111, condenser $C_4$ or tap 110 depending on the position of the tap along resistor $R_4$, leads 112 and 84, valve coil 43, through thermistor 44 and resistor $R_T$, and transformer lead 88.

Figure 6:
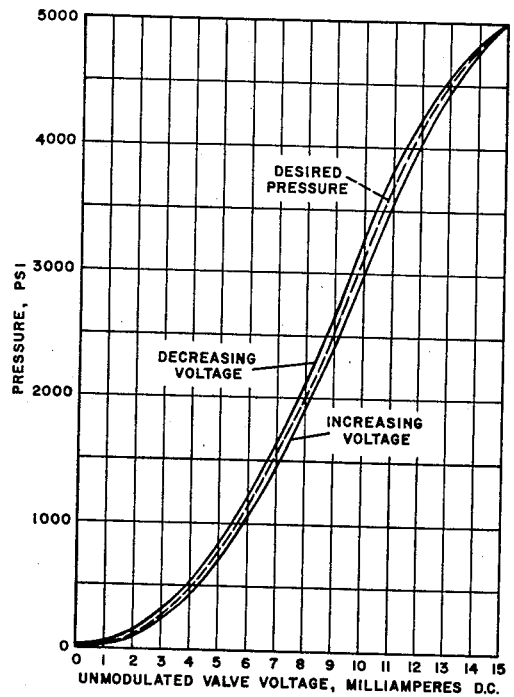
FIGURE 6 is a graph showing the effect of hysteresis on the relationship between coil current and valve pressure setting where the current contains no dithering component.
Figure 7:
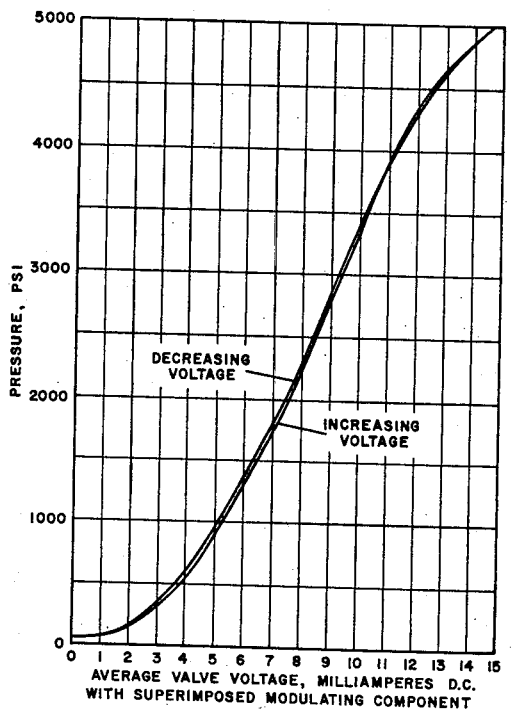
FIGURE 7 is a graph showing the manner in which the effects of hysteresis on the current-pressure relationship are minimized by the dithering control circuit of the invention.

By reason of the superimposition of the alternating potential or voltage established by the transformer on the direct voltage established by the power supply, the current in coil 43 becomes a modulated or fluctuating direct current which causes the coil flux to fluctuate very rapidly about an average value and thereby minimizes or narrows the range of hysteretic variation of the core material. In a typical valve of the type described, for example, the hysteresis of the core material causes a variation from the ideal relation between pressure and voltage of as much as plus or minus three to four percent in valve response pressure for a given direct current, as is graphically illustrated in FIGURE 6 wherein the ideal pressure-voltage relation is indicated by a dotted line and the actual pressure-voltage relations are indicated by labeled lines adjacent the ideal curve. We have found that by adding an alternating potential or voltage component to the direct voltage the valve response pressure variation due to hysteresis may be greatly reduced, to as little as plus or minus one half of one percent or less. For comparison, the variation of valve response pressure with a current which includes a modulating component is shown graphically in FIGURE 7 wherein the actual relations are shown by labeled lines and in which view it is substantially impossible to indicate the ideal because of the nearness of the actual relations.

It should be noted that the average direct voltage establishes the setting of the valve and that the alternating potential or voltage is effective to minimize the deviation about that setting which is due to the hysteresis of the core material of the transducer. It is desirable in all cases to use a relatively larger alternating potential or voltage at low pressure settings and a relatively smaller alternating potential or voltage for higher pressure settings. For example, the alternating potential or voltage may be considerably larger than the direct voltage for low valve pressure settings, and may be a fraction of the direct voltage for maximum valve pressure settings. As a specific example, where the maximum valve pressure corresponds to a direct voltage of 105 on the coil, the alternating voltage superimposed on the direct voltage may range in amplitude from 75 R.M.S. at low pressure settings, to 15 R.M.S. at maximum pressure setting. It is to be understood that these values are given by way of one example and that in certain applications of the invention they may be changed to suit the particular hysteresis characteristics of the particular transducer with which the invention is employed.

By ganging the resistors $R_2$, $R_3$ and $R_4$ as shown in FIGURE 4, the modulating voltage may be automatically reduced as the direct voltage is increased. Thus, as the taps are moved downwardly on the resistors the direct current component is reduced while the alternating component is increased. While this ganging arrangement is preferred, independently adjustable variable resistors might be used and a single resistor might be substituted in place of the two separate resistors $R_3$ and $R_4$.

The frequency of the modulating voltage is critical only in that it must be greater than the response time of the valve. In the embodiment of the invention illustrated 60 cycle current is above the response characteristics of the valve and it is preferred because of its availability.

When the control circuit is constructed to employ the aforementioned parameters it is possible to preset valve response pressure to within plus or minus one-half of one percent of a desired value. By changing parameters in the circuit, for example the parameters of transformer T and resistor $R_2$, the valve response pressure may be adjusted even more accurately. Once the correlation between valve pressure and coil current is established for any given value, the valve may be set at any desired pressure by adjusting the circuit resistances. This may be done simply by adjusting the positions of the taps of resistors $R_2$, $R_3$ and $R_4$. The control is relatively compact and inexpensive, and effects accurate control of the valve entirely by electrical means, without the necessity of referring to a pressure gauge. The resistances may be mounted remotely from the valve, and provide infinite adjustability of the valve over its entire operating range.

Figure 5:
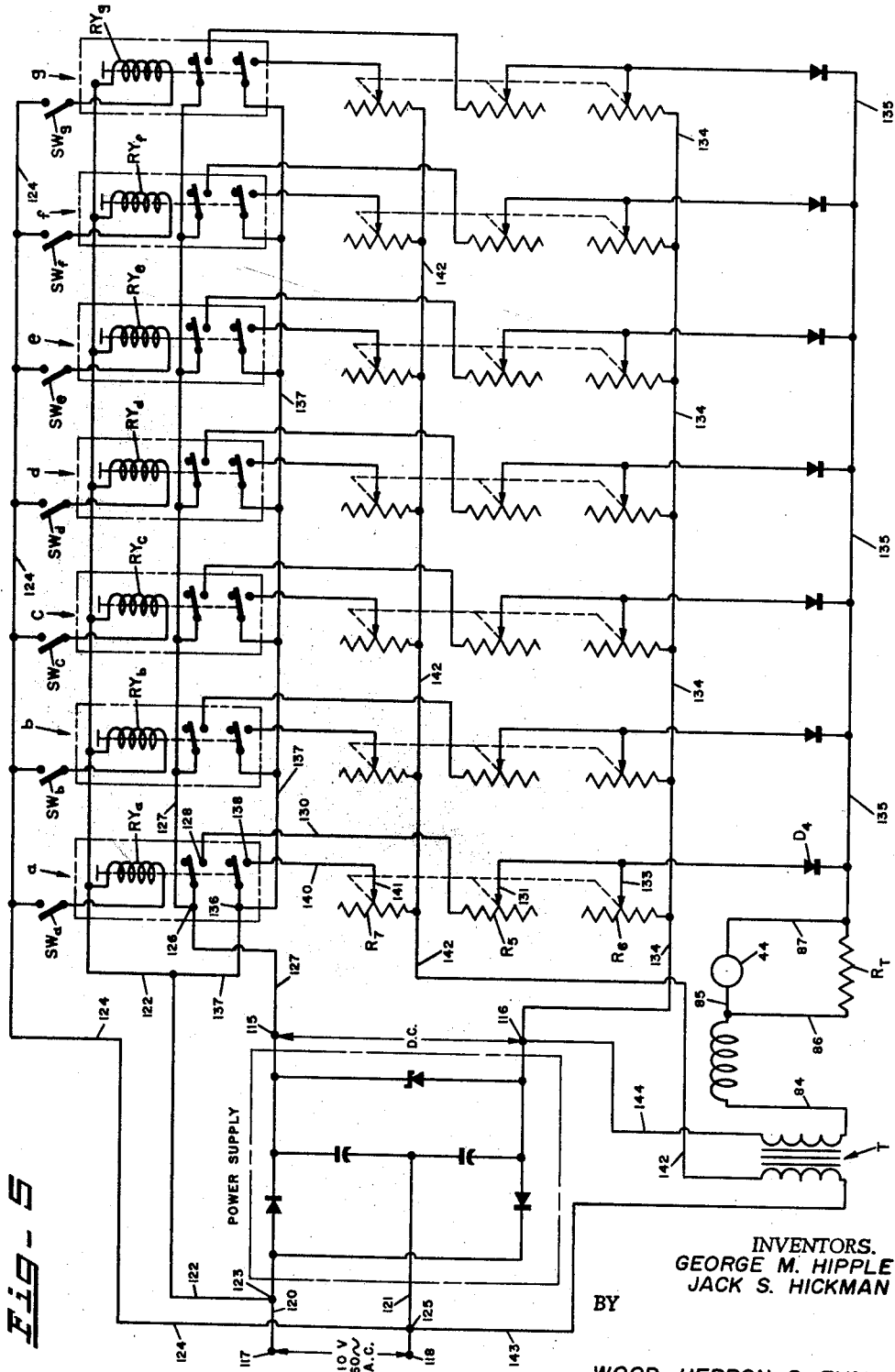
FIGURE 5 is a schematic diagram of a modified current control circuit in conjunction with an electromagnetically and fluid pressure operated valve.

The circuit of FIGURE 5 provides means whereby the valve pressure may automatically be set at any of a number of preselected values. It differs from the circuit of FIGURE 4 primarily in that the coil 43 is energizable through a plurality of selectively connectable preset resistors in place of the variable resistors of FIGURE 4. With this circuit, in other words, control is effected by switching fixed resistances into the circuit rather than by adjusting the setting of variable resistors.

In FIGURE 5, the control circuit is operated from a power supply shown in dashed lines which may be similar to that shown in conjunction with the control circuit of FIGURE 4 and which in any event supplies regulated or constant potential at connections 115 and 116, the former being positive with respect to the latter. The power supply is energized from a conventional source of alternating current at 117 and 118 through leads 120 and 121 respectively. A lead 122 is connected to lead 120 at 123, and a paralleling lead 124 is connected to lead 121 at 125.

Connected in parallel between leads 122 and 124 are a plurality of series connected switches $SW_a$–$SW_g$ and corresponding relays $RY_a$–$RY_g$ for selectively energizing the valve coil through any of a plurality of preset resistors. Each relay is of the double pole single throw type which, upon closure of its corresponding switch, is energized from leads 122 and 124 to close two pairs of contacts completing the control circuit through preset resistors. Each relay $RY_a$–$RY_g$ and its associated contacts are shown within dashed lines in FIGURE 5. Because the resistor circuits completed by closure of the contacts of each of the relays $RY_a$–$RY_g$ differ only in the magnitude of the resistance presented by the several resistors, only the circuitry designated as "a," associated with switch $SW_a$ and relay $RY_a$, will be described, it being understood that the other circuits b–g are similar.

The common terminal 126 of the upper set of contacts associated with relay $RY_a$ is connected to the positive power supply connection 115 by a lead 127. Terminal 128 of the upper set of contacts is connected through lead 130 to a preset variable resistor $R_5$ which has an adjustable tap 131. Tap 131 is connected to the adjustable tap 133 of a variable resistor $R_6$, a lead 134 connecting one side of $R_6$ to negative power supply connection 116. Tap 133 of resistor $R_6$ is connected through a diode $D_4$ to a lead 135. The function of diode $D_4$ in circuitry a, and the functions of the corresponding diodes in each of the other circuits b–g, is to isolate its circuit from the direct current in any other circuit, so that the current is blocked from passing through any of the other circuits.

The common terminal 136 of the lower set of contacts associated with relay $RY_a$ is connected to lead 122 through a lead 137. Terminal 138 of the lower set of contacts is connected through a lead 140 to the adjustable tap 141 of a variable resistor $R_7$. One side of $R_7$ is connected through a lead 142 to the primary winding of a transformer T. The other side of the primary is connected at 125 to a source of alternating current through a lead 143.

The secondary winding of the transformer T is connected at one end to negative power supply connection 116 through lead 144, and is connected at the other end to the valve coil 43 through lead 84. The valve coil is connected to lead 135 through a parallel connected thermistor 44 and resistor $R_T$.

When switch $SW_a$ is closed, relay $RY_a$ is energized by the potential between leads 122 and 124, and closes its two pairs of contacts. Direct current then flows from positive terminal 115 through lead 127 to terminal 126. Since this terminal is now in circuit connection with terminal 128, the current flows through lead 130 to resistor $R_5$. Depending on the exact setting of the tap of resistor $R_6$, part of the current in lead 131 will flow through $R_6$ and lead 134 to negative connection 116, while the remainder will flow through diode $D_4$ and lead 135 to the valve coil, then through the transformer secondary to connection 116.

Since terminals 136 and 138 of the lower set of contacts of relay $RY_a$ are now in circuit connection, alternating voltage is applied to the circuit through leads 120 and 122, terminals 136 and 138, lead 140, resistor $R_7$, lead 142 and the primary winding of transformer T, leads 143 and 121. This alternating current in the transformer primary causes a modulation or fluctuation to be superimposed on the direct voltage in the circuit so that, as before, the total voltage applied to the valve coil 43 comprises a direct component and a modulating component.

From this it will be seen that the circuit of FIGURE 5 functions in a generally similar manner to that of FIGURE 4 in minimizing the hysteretic variations in the magnetization of the core of the valve transducer. The additional circuits b–g are similar, but the resistors of those circuits are set to provide different coil voltages and therefore different valve pressure settings.

By means of the circuit of FIGURE 5, for example, the valve may be accurately set to maintain the pressure in a hydraulic line at, say, 500, 1000, 1500, 2000, 3000, 4000 or 5000 p.s.i. as desired simply by closing the appropriate switch $SW_a$–$SW_g$. It is contemplated that the switches may be automatically actuated as well as manually actuated. For example, the switches may be positioned for actuation by the ram of a hydraulic press so that they are closed and opened in sequence as the ram moves past them to provide proper pressure on the press ram to suit the operation being performed.

Preferred parameters of the components of the circuit of FIGURE 5, given only by way of example, are as follows: $R_5$ and corresponding resistors, 5K ohms; $R_6$ and corresponding resistors, 25K ohms; $R_7$ and corresponding resistances, 1000 ohms; $R_T$, 5600 ohms; $D_4$ and corresponding diodes, 150 ma.; valve coil 6000 ohms. The preferred direct current power supply is the same as shown in FIGURE 4.

While the embodiment of the present invention disclosed herein is a preferred embodiment, it is to be understood that other embodiments may be adopted without departing from its principle or the scope of the claims which follow.

Having described our invention, we claim:

1. The combination of a valve having a movable valve member cooperable with a port, an electromechanical transducer for actuating said valve member in response to a direct voltage applied to said transducer, said transducer having an element made of a material which displays magnetic hysteresis, and an electric circuit connected to said transducer for supplying a direct voltage to said transducer, said circuit also including means for imparting controlled fluctuations to said direct voltage whereby the effective hysteresis displayed by said element is substantially reduced.

2. The combination of a valve having a movable valve member cooperable with a port, an electromechanical transducer for actuating said valve member in response to a direct voltage applied to said transducer, said transducer having an element made of a material which displays magnetic hysteresis, and an electric circuit connected to said transducer, said electric circuit including means for supplying direct voltage to said transducer; means for modulating said direct voltage, and adjustable means for determining the direct voltage and the output amplitude of said modulating means inversely.

3. The combination of a valve having a movable valve member cooperable with a port, an electromechanical transducer for actuating said valve member in response to a direct voltage applied to said transducer, said transducer having an element made of a material which displays magnetic hysteresis, and an electric circuit connected to said transducer, said electric circuit including means for applying direct voltage to said transducer, means for superimposing alternating voltage on said direct voltage for reducing hysteresis in said element, and means for varying said direct voltage and said alternating voltage inversely.

4. The combination of a valve having a movable valve member cooperable with a port, an electromagnetic transducer for actuating said valve member in response to a direct voltage applied to said transducer, said transducer having an element made of a material which displays magnetic hysteresis, and an electric circuit connectable to said transducer for supplying a voltage to said transducer which voltage includes a direct component and an alternating component, whereby the hysteresis displayed by said element in response to a given direct voltage is substantially reduced.

5. The combination of a valve having a movable valve member cooperable with a port, an electromagnetic transducer for actuating said valve member in response to a direct voltage applied to said transducer, said transducer having an element made of a material which displays magnetic hysteresis, and an electric circuit connectable to said transducer for supplying a voltage to said transducer which voltage includes a direct component for operating said transducer and an alternating component, whereby the hysteresis displayed by said element in response to a given direct voltage is substantially reduced, said circuit including means for varying the magnitudes of said alternating voltage component and said direct voltage component.

6. The combination of a valve having a movable valve member cooperable with a port, an electromagnetic transducer for actuating said valve member in response to a direct voltage applied to said transducer, said transducer having an element made of a material which displays magnetic hysteresis, and an electric circuit connectable to said transducer for supplying a voltage to said transducer which includes a direct component for operating said transducer and an alternating component, whereby the hysteresis displayed by said element in response to a given direct voltage is substantially reduced, said circuit including selectively connectable preset means for establishing the magnitude of said alternating voltage component and said direct voltage component.

7. The combination of a valve having a valve member cooperable with a port, an electromagnetic transducer effective when energized to establish an electromagnetic flux, said transducer having a ferromagnetic core, said valve member being movable with respect to said port in response to the electromagnetic flux established by said transducer, and an electric circuit for energizing said transducer, said circuit being effective to supply a voltage to said transducer which includes a direct component and an alternating component, whereby the average hysteretic variations in the magnetization induced in said core when said circuit energizes said transducer are effectively minimized.

8. The combination of a valve having a valve member cooperable with a port, an electromagnetic transducer effective when energized to establish an electromagnetic flux, said transducer having a ferromagnetic core, said valve member being movable with respect to said port in response to the electromagnetic flux established by said transducer, and an electric circuit for energizing said transducer, said circuit being effective to supply a voltage to said transducer, said voltage including a direct component and an alternating component whereby the average hysteretic variations in the magnetization induced in said core when said circuit energizes said transducer are effectively minimized, said circuit including means for controlling the magnitudes of said direct component and said alternating component inversely.

9. The combination of a valve adapted to be operated by magnetomotive and fluid pressure forces, said valve including a movable element adapted to be acted upon in opposite directions by said magnetomotive and fluid pressure forces, an electromagnetic transducer for supplying said magnetomotive force, and an electric circuit for controlling the magnetomotive force supplied by said transducer, said circuit comprising, means effective to establish a direct voltage, means effective to superimpose an alternating voltage on said direct voltage, means for varying the magnitudes of said direct and alternating voltages, and means for electrically connecting said circuit to said transducer, said alternating voltage being effective to minimize the average hysteretic variations in the magnetomotive force supplied by said transducer in response to said direct voltage.

10. The combination of a valve adapted to be operated by magnetomotive and fluid pressure forces, said valve including a movable element adapted to be acted upon in opposite directions by said magnetomotive and fluid pressure forces, an electromagnetic transducer for supplying said magnetomotive force, and an electric circuit for controlling the magnetomotive force supplied by said transducer, said circuit comprising, means effective to establish a direct voltage, means effective to superimpose an alternating voltage on said direct voltage, means for varying the magnitudes of said direct and alternating voltages such that the magnitude of said alternating voltage is diminished when the magnitude of said direct voltage is increased, and means for electrically connecting said circuit to said transducer, said alternating voltage being effective to minimize the average hysteretic variations in the magnetomotive force supplied by said transducer in response to said direct voltage.

11. The combination of a valve adapted to be operated by magnetomotive and fluid pressure forces, said valve including a movable element adapted to be acted upon in opposite directions by said magnetomotive and fluid pressure forces, an electromagnetic transducer for supplying said magnetomotive force, and an electric circuit for controlling the magnetomotive force supplied by said transducer, said circuit comprising, means effective to establish a direct voltage, means effective to superimpose an alternating voltage on said direct voltage, selectively connectable means for regulating the magnitudes of said direct and alternating voltages, and means for electrically connecting said circuit to said transducer, said alternating voltage being effective to minimize the average hysteretic variations in the magnetomotive force supplied by said transducer in response to said direct voltage.

12. The combination of a valve adapted to be operated by mechanical and fluid pressure forces, said valve including a control port and a movable element adapted to control said port, said movable element being urged away from said port by fluid pressure at said port and urged toward said port by said mechanical force, an electromechanical transducer for providing said mechanical force, and an electric circuit for actuating said electromechanical transducer, said circuit including means for superimposing an alternating voltage on a direct voltage and means fixing the magnitudes of said alternating and direct voltages.

13. The combination of a valve adapted to be operated by mechanical and fluid pressure forces, said valve including a control port and a movable element adapted to control said port, said movable element being urged away from said port by fluid pressure at said port and urged toward said port by said mechanical force, an electromechanical transducer for providing said mechanical force, and an electric circuit for actuating said electromechanical transducer, said circuit including means having an alternating voltage output for modulating a direct voltage, and means for applying the resultant modulated direct voltage to said transducer.

14. The combination of a valve adapted to be operated by mechanical and fluid pressure forces, said valve including a control port and a movable element adapted to control said port, said movable element being urged away from said port by fluid pressure at said port and urged toward said port by said mechanical force, an electromechanical transducer for providing said mechanical force, and an electric circuit for actuating said electromechanical transducer, said circuit including means having an alternating voltage output for modulating a direct voltage, means for applying the resultant modulated direct voltage to said transducer, and selectively connectable means for establishing the magnitudes of the output of said alternating and direct voltages.

15. The combination of a valve adapted to be operated by mechanical and fluid pressure forces, said valve including a body having a bore, a pressure outlet communicating with said bore, an inlet passageway entering said bore, a pressure limiting and shut-off valve for controlling the pressure of fluid within said passageway, the pressure in said passageway exerting a force tending to open said pressure limiting and shut-off valve, an electromagnetic transducer delivering a mechanical force in response to a direct current input thereto, said transducer including a coil and a core, said core displaying the characteristic of ferromagnetic hysteresis, the force of said transducer maintaining said valve closed until the pressure in said passageway acting upon said pressure limiting and shut-off valve overcomes the force of said transducer and thereafter the force of said transducer controlling said pressure limiting and shut-off valve to maintain the pressure in said passageway in relation to the electrical input to said transducer, and an electrical circuit adapted to reduce the hysteretic variation in mechanical force produced by said electromechanical transducer in response to a given direct voltage input thereto, said circuit comprising means to superimpose an alternating voltage on said direct voltage input so that the instantaneous total voltage input to said transducer is the algebraic sum of the magnitude of said direct voltage input and the instantaneous magnitude of said alternating voltage.

16. The combination of a valve, an electromechanical transducer for controlling said valve, and an electric circuit for controlling said electromechanical transducer, said valve comprising a body having a bore, a pressure inlet port and an outlet port each communicating with said bore, fluid pressure operated valve means between said ports, means forming a control chamber communicating with said bore the pressure in which effects operation of said valve, pressure limiting and shut-off valve means for controlling the pressure of fluid within said chamber, the pressure in said chamber exerting a force tending to open said pressure limiting and shut-off valve means, said transducer delivering a mechanical force in response to a direct voltage input thereto which force for any given direct voltage input thereto varies with the past magnetization of said electromechanical transducer, the force of said electromechanical transducer maintaining said valve closed until the pressure in said chamber acting upon said pressure limiting and shut-off valve means overcomes the force of said electromechanical transducer and thereafter the force of said electromechanical transducer controls said pressure limiting and shut-off valve means to maintain the pressure in said chamber in relation to the electrical voltage input to said electromechanical transducer, said circuit comprising means connected to said electromechanical transducer for supplying an electrical voltage input to said electromechanical transducer which includes a direct component and an alternating component, said alternating component being effective to reduce the effect of the past magnetization of said electromechanical transducer on the mechanical force delivered by said electromechanical transducer in response to said direct voltage component.

17. The combination of a valve having a movable valve member cooperable with a port, an electromechanical transducer for actuating said valve member in response to a voltage applied to said electromechanical transducer, and an electrical circuit for supplying a voltage to said electromechanical transducer which voltage includes a direct component and an alternating component superimposed thereon, said circuit comprising, a transformer having a primary winding and a secondary winding, means including a resistance for connecting said primary winding to a source of alternating voltage, and means including a resistance for connecting said secondary winding to a source of direct voltage and to said electromechanical transducer.

18. The combination of a valve having a movable valve member cooperable with a port, an electromechanical transducer for actuating said valve member in response to a voltage applied to said electromechanical transducer, and an electrical circuit for supplying a voltage to said electromechanical transducer which voltage includes a direct component and an alternating component superimpressed thereon, said circuit comprising a transformer having a primary winding and a secondary winding, means for connecting said primary winding to a source of alternating voltage, said means including a resistor for controlling the magnitude of said alternating component, first lead means for connecting one end of said secondary winding in series with said electromechanical transducer to one pole of a source of direct voltage, second lead means for connecting the other end of said electromechanical transducer to a second pole of said source of direct voltage, at least one of said leads including at least one resistor for controlling the magnitude of said direct voltage component.

19. The combination of a valve having a movable valve member cooperable with a port, an electromechanical transducer for actuating said valve member in response to a voltage applied to said transducer, and an electrical circuit for supplying a voltage to said electromechanical transducer which voltage includes a direct component and an alternating component superimpressed thereon, said circuit comprising, a transformer having a primary winding and a secondary winding, means for connecting said primary winding to a source of alternating voltage, said means including a resistor for establishing the magnitude of said alternating voltage component, means for connecting said secondary winding in series with a capacitor and said electromechanical transducer, and leads connected at each end of said capacitor for connection to a source of direct voltage, said leads including at least one resistor for establishing the magnitude of said direct voltage component.

20. The combination of claim 19 wherein said resistors are variable.

21. The combination of claim 20 wherein said resistors are ganged together for simultaneous control in such manner that the magnitude of said alternating voltage component is increased as the magnitude of said direct voltage component is decreased.

22. The combination of a valve having a movable valve member cooperable with a port, an electromechanical transducer for actuating said valve member in response to a voltage applied to said transducer, and an electrical circuit for supplying a voltage to said transducer which voltage includes a direct component and an alternating component superimposed thereon, said circuit comprising, a transformer having a primary winding and a secondary winding, means for connecting said primary winding to a source of alternating voltage including a first plurality of selectively connectable preadjustable variable resistors for controlling the magnitude of said alternating voltage component, means for connecting said secondary winding in series with said transducer to a source of direct voltage including a second plurality of selectively connectable preadjustable variable resistors for controlling the magnitude of said direct voltage component.

23. The combination of claim 22 wherein said circuit includes relay means for simultaneously selectively connecting one of said first plurality of resistors and one of said second plurality of resistors.

24. The combination of claim 22 wherein said means for connecting said secondary winding includes a diode connected in series between said second plurality of resistors and said secondary winding.

25. The combination of a valve, an electromagnetic transducer for controlling said valve, and an electric circuit for controlling said transducer, said valve comprising a body having a bore, a pressure inlet port and an outlet port each communicating with said bore, fluid pressure operated valve means between said ports, means forming a control chamber communicating with said bore the pressure in which effects operation of said valve, pressure limiting and shut-off valve means for controlling the pressure of fluid within said chamber, the pressure in said chamber exerting a force tending to open said pressure limiting and shut-off valve means, said transducer delivering a mechanical force in response to an electrical voltage input thereto, which force for a given direct voltage varies with the past magnetization of said transducer, the force of said transducer maintaining said valve closed until the pressure in said chamber acting upon said pressure limiting and shut-off valve means overcomes the force of said transducer and thereafter the force of said transducer controls said pressure limiting and shut-off valve means to maintain the pressure in said chamber in relation to the electrical voltage input to said transducer, said circuit being connectable to said transducer to supply an electrical voltage input thereto which input includes a direct component and an alternating component, said alternating component being effective to reduce the effect of the past magnetization of said transducer on the mechanical force delivered by said transducer in response to said direct voltage component, said circuit comprising, a transformer having a primary winding and a secondary winding, means including a resistance for connecting said primary winding to a source of alternating voltage, and means including a resistance for connecting said secondary winding to a source of direct voltage and to said transducer.

References Cited by the Examiner

UNITED STATES PATENTS

| | | | |
|---|---|---|---|
| 1,297,514 | 3/19 | Turner | 303—59 |
| 2,031,478 | 2/36 | Gray | 137—505.11 |
| 2,219,441 | 10/40 | Carnes | 137—505.46 |
| 2,619,111 | 11/52 | Renick | 137—489 |
| 2,700,395 | 1/55 | Young | 137—529 |
| 2,802,154 | 8/57 | Bonn et al. | 317—123 |

FOREIGN PATENTS

| | | |
|---|---|---|
| 212,570 | 8/09 | Germany. |
| 740,225 | 11/55 | Great Britain. |

MARTIN P. SCHWADRON, *Acting Primary Examiner.*